United States Patent [19]
Lee et al.

[11] Patent Number: 6,078,720
[45] Date of Patent: Jun. 20, 2000

[54] APPARATUS FOR COPYING A SIGNAL RECORDED ON A VIDEO RECORDING MEDIUM WITHOUT DEMODULATION

[75] Inventors: Jong-wan Lee, Kyungki-do; Chul-min Kim, Anyang, both of Rep. of Korea; Tanikuchi Yashilo, Kanakayaken, Japan

[73] Assignee: Samsung Electronics Co., Ltd., Kyungki-do, Rep. of Korea

[21] Appl. No.: 08/909,052

[22] Filed: Aug. 11, 1997

[30] Foreign Application Priority Data

Aug. 9, 1996 [KR] Rep. of Korea ................... 96-33269

[51] Int. Cl.$^7$ ................................................ H04N 9/79
[52] U.S. Cl. ................................ 386/4; 386/6; 386/13
[58] Field of Search .................... 386/9, 10, 11, 386/13, 14, 15, 16, 17, 18, 19, 20, 4, 2, 23, 29, 39; 348/644, 645, 647; 360/15, 27, 48, 53, 61

[56] References Cited

U.S. PATENT DOCUMENTS

| | | |
|---|---|---|
| 4,344,083 | 8/1982 | Srivastava ................................ 348/645 |
| 4,647,983 | 3/1987 | Ota . |
| 4,792,862 | 12/1988 | Tsusue et al. . |
| 5,097,345 | 3/1992 | Ando et al. ................................ 386/10 |
| 5,194,963 | 3/1993 | Dunlap et al. . |
| 5,510,898 | 4/1996 | Yoshimura et al. ...................... 386/13 |

Primary Examiner—Wendy Garber
Assistant Examiner—Christopher Onuaku
Attorney, Agent, or Firm—Sughrue, Mion, Zinn, Macpeak & Seas, PLLC

[57] ABSTRACT

An apparatus for picking up a video signal recorded on a recording medium and copying a frequency modulated signal without demodulation. In the apparatus, a high-pass filter separates a high-frequency modulated luminance signal from the modulated video signal by setting a cutoff frequency higher than a frequency band of a low frequency converted color signal. A limiter receives an output signal of the high-pass filter and limits variation of the amplitude of the output of the high-pass filter to a predetermined level. A first feature compensator receives the output signal of the limiter and corrects high frequency characteristics of the signal. A low-pass filter separates a low frequency converted color signal and a low-frequency modulated luminance signal, each having a frequency that is lower than the cutoff frequency, from the modulated video signal. A gain controller receives an output signal of the low-pass filter and maintains the received signal at a constant level. A second feature compensator receives an output signal of the gain controller and corrects low frequency characteristics of the output signal of the gain controller. A mixer mixes an output signal of the first feature compensator with the output signal of the second feature compensator, wherein the mixed signal is output and recorded on a recording medium by a video head.

12 Claims, 4 Drawing Sheets

APPARATUS FOR COPYING A SIGNAL RECORDED ON A VIDEO RECORDING MEDIUM WITHOUT DEMODULATION

BACKGROUND OF THE INVENTION

1. Field of the Invention

The present invention relates to a video signal recording apparatus, and more particularly, to an apparatus for picking up a video signal recorded on a recording medium and copying a frequency modulated (FM) signal without demodulation. The present invention is based on Korean Patent Application No. 96-33269, which is incorporated herein by reference.

2. Description of the Related Arts

Copying a video signal recorded on a video tape is generally carried out as follows.

A VCR on a reproducing side first picks up a modulated and recorded video signal, compensates the amplitude and frequency characteristics of the picked-up video signal using a pre-amplifier and an equalizer, and demodulates the frequency characteristics compensated modulated video signal and outputs the result. A VCR on a recording side then receives the demodulated video signal output by the VCR on the reproducing side, compensates the frequency characteristics of the received demodulated video signal, modulates the frequency characteristics compensated demodulated video signal again, and then records the result on a tape through a video head via a recording amplifier.

Copying the modulated video signal without demodulating it has-recently become possible. According to a recent technique of directly copying a modulated video signal, noise can be reduced and the number of component parts decreased, compared with a conventional video copying technique.

FIG. 3 is a block diagram showing the configuration of a conventional video signal copying apparatus. FIGS. 4A through 4D show the frequency characteristics of signals in the conventional apparatus shown in FIG. 3.

A recent video signal copying apparatus will be now briefly be described, referring to FIGS. 3 and 4A through 4D.

A modulated video signal picked up from a tape by a video head has a color signal (LC) and a luminance signal (YFM) as shown in FIG. 4A. However, since the signal processing procedures for the luminance and color signals are different from each other, the signals are separated by a high-pass filter 301 and a low-pass filter 306. The output signal of the high-pass filter 301, including only the frequency modulated luminance signal (YFM) as shown in FIG. 4B, is converted into a recording luminance signal by a phase corrector 302 for correcting the delay time and the phase, compensated by an FM signal equalizer 303 for compensating frequency characteristics, limited by a double limiter 304 for preventing black-and-white inversion, and corrected and amplified by a first recording equalizer 305 for correcting recording frequency characteristics and amplifying the frequency-corrected recording signal.

The output signal of the low-pass filter 306, being a low frequency converted color signal (LC) as shown in FIG. 4C, is amplified to a predetermined level by a voltage control amplifier 307, and then converted into a recording color signal by a second recording equalizer 308 for correcting frequency characteristics and amplifying the frequency-corrected signal.

Thereafter, the recording luminance and color signals are mixed by a mixer 313, and the mixed output signal is recorded on a tape by a video head as a signal having the frequency characteristic shown in FIG. 4D.

However, black-and-white inversion may occur when a signal is processed, even in the above-described recent copying technique of directly recording a modulated video signal without demodulation. That is, a large-amplitude but low-frequency component and a small-amplitude but high-frequency component are mixed in an FM luminance signal. However, the frequency component having a small amplitude, being an FM carrier of a white clip, does not cross the zero reference level of a limiter while passing through the limiter circuit, so that a portion of a carrier signal may not be output. Accordingly, when a limited signal is demodulated, a portion of the carrier at a white clip portion of the FM carrier signal is lost, resulting in black-and-white inversion.

Also, according to a recent conventional modulated video signal recording apparatus, a filter for separating the low frequency converted color signal from the demodulated video signal has a narrow frequency band, so that its delay time is increased due to the characteristics of the filter.

Accordingly, a delay correcting circuit for correcting a difference in delay time of a filter is required for processing the separated FM luminance signal. Also, the number of component parts increases, and the signal characteristics are deteriorated by the delay correcting circuit.

SUMMARY OF THE INVENTION

Accordingly, to solve the above problems, an object of the present invention is to provide a video signal copying apparatus in which black-and-white inversion and the delay time of a filter for processing a signal are improved by changing a cutoff frequency for separating a low frequency converted color signal from a frequency modulated (FM) luminance signal to a frequency in the frequency band of the FM luminance signal component.

To accomplish the above object, there is provided a copying apparatus for picking up a modulated video signal recorded on a recording medium and directly copying the modulated video signal onto another medium. The apparatus comprises a high-pass filter for separating a high-frequency modulated luminance signal from the modulated video signal by setting a cutoff frequency higher than a frequency band of a low frequency converted color signal; a limiter for receiving an output signal of the high-pass filter and limiting variation of the amplitude of the output of the high-pass filter to a predetermined level; a first feature compensator for receiving the output signal of the limiter and correcting high frequency characteristics of the signal; a low-pass filter for separating a low frequency converted color signal and a low-frequency modulated luminance signal, each having a frequency that is lower than the cutoff frequency, from the modulated video signal; a gain controller for receiving an output signal of the low-pass filter and maintaining the received signal at a constant level; a second feature compensator for receiving an output signal of the gain controller and correcting low frequency characteristics of the output signal of said gain controller; and a mixer for mixing an output signal of the first feature compensator with the output signal of the second feature compensator; wherein the mixed signal is output and recorded on a recording medium by a video head.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE PREFERRED EMBODIMENTS

Figure 1:
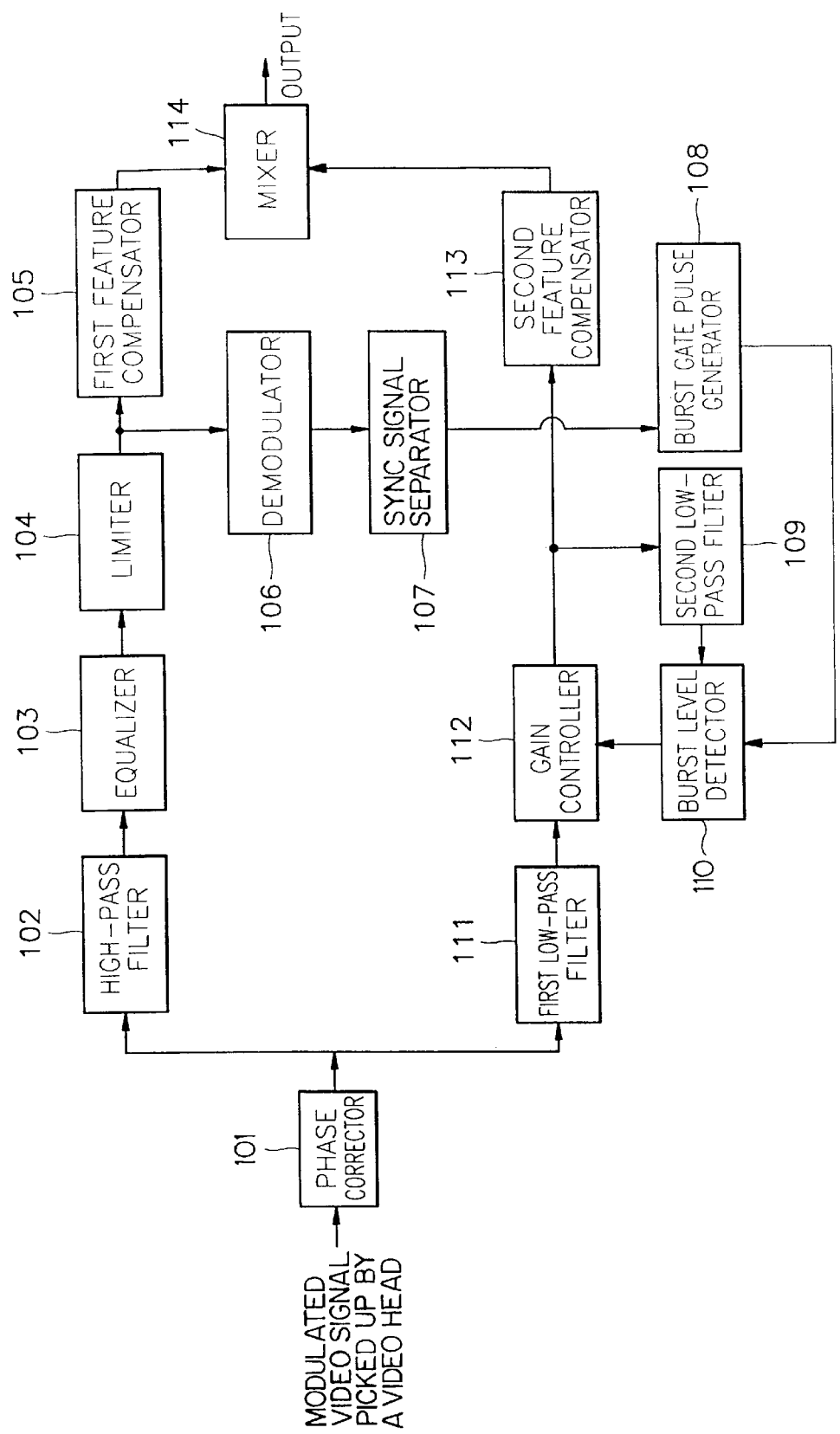
FIG. 1 is a block diagram showing the configuration of an apparatus for copying a signal recorded on a video recording medium according to the present invention.

FIG. 1 shows a copying apparatus for a video signal recorded on a recording medium according to the present invention, wherein filter delay time and black-and-white inversion are improved. The copying apparatus includes a phase corrector 101 for reducing an overshoot or an undershoot of an input signal, a high-pass filter 102 for outputting only a high frequency component of an input signal, an equalizer 103 for compensating frequency, a limiter 104 for limiting the amplitude variation, a first feature compensator 105 (which may also be referred to as a first characteristic compensator) for correcting the frequency and phase features of a modulated luminance signal which is being recorded, a demodulator 106 for demodulating the modulated luminance signal, a synchronous signal separator 107 for separating a synchronous signal a burst gate pulse generator 108 for generating a burst gate pulse for detecting a burst signal, a second low-pass filter 109 for outputting only a low frequency component of an input signal, a burst level detector 110 for detecting the burst signal, a first low-pass filter 111 for outputting only a low frequency component of the input signal, a gain controller 112 for applying a gain according to an applied voltage, a second feature compensator 113 (which may also be referred to as a second characteristic compensator) for correcting the frequency and phase features of a recording color signal and a low pass luminance signal, and a mixer 114 for mixing multiple input signals.

In a general VHS-type VCR, a video signal recorded on a tape includes color and luminance signals. The VCR converts the color signal into a low frequency through color signal low-pass frequency conversion and the luminance signal into a high frequency through frequency modulation in order to avoid mutual interference. Thereafter, both signals are mixed and recorded on a tape.

The phase corrector 101 improves generation of an overshoot and an undershoot in a modulated video signal picked up by a video head, corrects the frequency and phase characteristics, and then outputs the result.

Figure 2B:
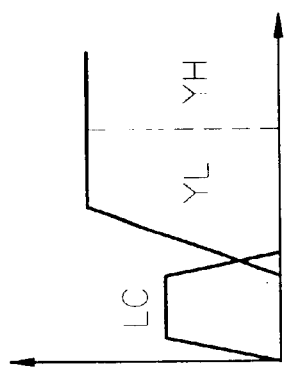
FIGS. 2A through 2D show frequency distributions of the essential signals shown in FIG. 1.
Figure 2A:
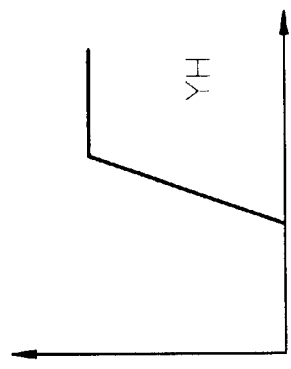

The high-pass filter 102 outputs only a high-frequency luminance signal from the output signal of the phase corrector 101 as a luminance signal (YH) having the frequency characteristic shown in FIG. 2B.

At this time, when the cutoff frequency of the high-pass filter 102 for separating a high frequency signal from a low frequency signal is set to a particular frequency, an additional delay circuit is not required. The particular cutoff frequency is that which does not generate a difference in delay time between a high frequency luminance signal (YH), and a color signal (LC) and a low frequency luminance signal (YL), which are input to the mixer 114, taking into consideration delay times according to the frequency bands of the high-pass filter 102 and the first low-pass filter 111.

The equalizer 103 receives the high-pass filtered modulated luminance signal (YH) and performs a frequency correction, emphasizing the high frequency component of the received signal, in order to compensate for high frequency attenuation of the signal due to the characteristics of the video head.

The limiter 104 receives the output signal of the equalizer 103, limits the signal to a certain level, and outputs the result. Since the luminance signal picked up by the video head is a frequency modulated signal, the amplitude of the signal does not affect the demodulation thereof. Thus, the amplitude of the signal should be limited and output uniformly in order to remove direct-current ripple and noise from the signal.

Figure 4D:
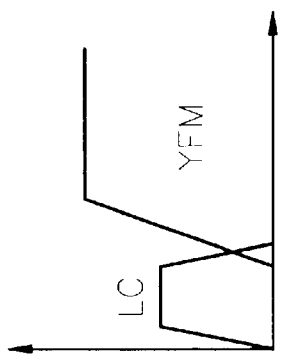
FIGS. 4A through 4D are frequency distribution views for showing frequency characteristics of signals of the conventional video signal copying apparatus shown in FIG. 3.
Figure 4B:
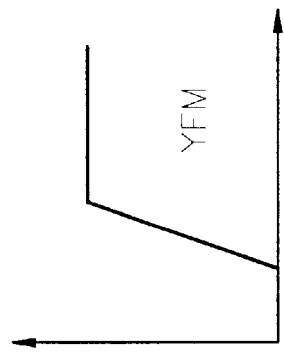
Figure 4C:
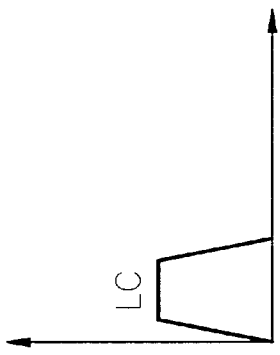
Figure 4A:
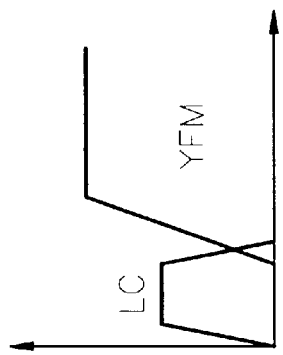

In the present invention, a cutoff frequency for separating a color signal is set to be higher than in the conventional modulated signal copying apparatus, so that the frequency of the modulated luminance signal is limited to a small band. That is, since the luminance signal (YH) of FIG. 2B uses a narrower frequency band than that of the luminance signal (YFM) of FIG. 4B, loss of the carrier signal in a high frequency region is reduced even if a single limiter is used. Thus, black-and-white inversion can be improved.

Also, a double limiter can be used as the limiter to further improve black-and-white inversion.

The double limiter limits a small-amplitude, high-frequency component separated from an input signal by a high-pass filter, amplifies the result, to thereby produce a first signal. Also, the double limiter mixes the first signal with a large-amplitude, low-frequency component separated from an input signal by a low-pass filter, and then limits the result. At this time, the small-amplitude, high-frequency component is also zero-crossed to prevent black-to-white inversion.

The first feature compensator 105 receives the limited signal, compensates the signal for the attenuation of certain frequencies during recording, corrects the phase of the luminance and color signals, and outputs the result.

The demodulator 106 receives the output of the limiter 104, demodulates the frequency-modulated luminance signal, and outputs the result.

The synchronous signal separator 107 separates only a synchronous signal from the demodulated luminance signal and outputs the separated synchronous signal.

The burst gate pulse generator 108 delays the separated synchronous signal by a predetermined time and generates a pulse for gating a color burst signal.

Figure 2C:
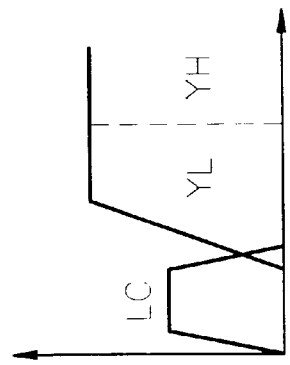

The first low-pass filter 111 receives the output signal of the phase corrector 101, and outputs only the low-frequency signals (LC+YL) shown in FIG. 2C by setting the same cutoff frequency as that of the high-pass filter 102.

The gain controller 112 receives the output signals (LC+YL) of the first low-pass filter 111 and constantly maintains the level of its output signal.

The low frequency modulated luminance signal (YL) is removed from the output signal of the gain controller 112 by the second low-pass filter 109, and only the low frequency converted color signal (LC) is passed and output.

The burst level detector 110 detects only a color burst signal from the low frequency converted color signal (LC), using the gate pulse of the burst gate pulse generator 108, and outputs the detected color burst signal.

The gain controller 112 controls the amplification degree to constantly maintain the level of the above-detected burst signal.

The second feature compensator 113 corrects the low-pass frequency and phase of the output signal of the gain controller 112, and outputs the result.

Figure 2D:
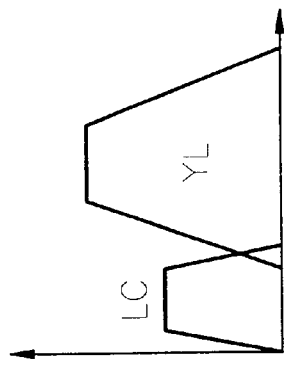
Figure 3:
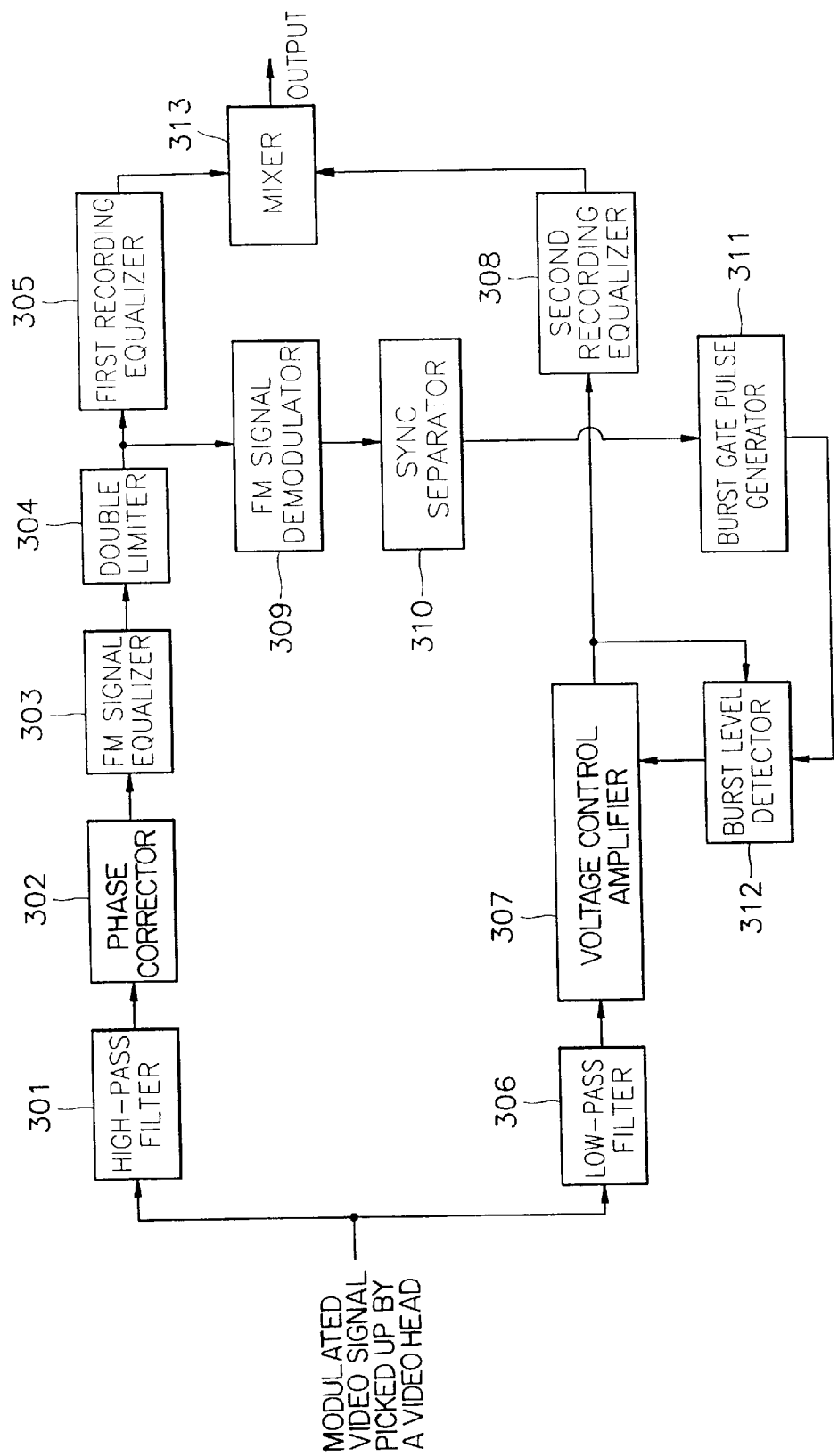
FIG. 3 is a block diagram showing the configuration of a conventional video signal copying apparatus.

The mixer 114 mixes the high-frequency luminance signal (YH) output by the first feature compensator 105, with the color signal (LC) and the low-frequency luminance signal (YL) which are output by the second feature compensator 113, and outputs a modulated video recording signal as shown in FIG. 2D. The output signal of the mixer 114 is recorded on a tape by a video head.

As described above, according to the present invention, a cutoff frequency, for separating a color signal from a luminance signal, is appropriately selected so that the delay time and the phase of the color signal and the low-frequency luminance signal can match those of the high-frequency luminance signal before the signals are mixed. Thus, a delay circuit and a phase correcting circuit are not needed. Also, the band for processing the luminance signal is reduced, compared with the conventional apparatus, to prevent black-and-white inversion occurring during demodulation of the frequency-modulated luminance signal.

The present invention, described in detail referring to a VCR as an embodiment, is not limited to the VCR, and it is apparent to those skilled in the art that the above-described present invention is applicable to all recording apparatuses for separating the color signal and the luminance signal into different frequency bands and recording the separated signals.

While only certain embodiments of the invention have been specifically described herein, it will apparent that numerous modifications may be made thereto without departing from the spirit and scope of the invention.

What is claimed is:

1. A copying apparatus for picking up a modulated video signal recorded on a recording medium and directly copying the modulated video signal onto another medium, comprising:

a high-pass filter for separating a high-frequency modulated luminance signal from the modulated video signal by setting a cutoff frequency higher than a frequency band of a low frequency converted color signal;

a limiter for receiving an output signal of said high-pass filter and limiting variation of the amplitude of the output signal of said high-pass filter to a predetermined level;

a first feature compensator for receiving the output signal of said limiter and correcting high frequency characteristics of the output signal of said limiter;

a first low-pass filter for separating a low frequency converted color signal and a low-frequency modulated luminance signal, each having a frequency that is lower than the cutoff frequency, from said modulated video signal;

a gain controller for receiving an output signal of said first low-pass filter and maintaining the output signal of said first low-pass filter at a constant level;

a second feature compensator for receiving an output signal of said gain controller and correcting low frequency characteristics of the output signal of said gain controller; and a mixer for mixing an output signal of said first feature compensator with an output signal of said second feature compensator;

wherein the mixed signal is output and recorded on a recording medium by a video head.

2. The copying apparatus as claimed in claim 1, further comprising a phase corrector, disposed before said high-pass filter and said first low-pass filter, for correcting phase characteristics of the modulated video signal.

3. The copying apparatus as claimed in claim 1, wherein the cutoff frequency is set to be a frequency such that a delay time of said high-pass filter matches a delay time of said low-pass filter.

4. The copying apparatus as claimed in claim 1, wherein said limiter is comprised of a double limiter.

5. The copying apparatus as claimed in claim 1, wherein said gain controller detects the level of a color burst signal, and controls the amplification factor on the basis of the level of said color burst signal such that the level of the output signal of said gain controller is maintained constant.

6. The copying apparatus as claimed in claim 1, further comprising an equalizer, disposed between said high-pass filter and said limiter, for receiving the output signal of said high-pass filter and performing a frequency correction to emphasize the high frequency component of the output signal of said high-pass filter.

7. The copying apparatus as claimed in claim 1, further comprising a demodulator for receiving and demodulating the output signal of said limiter.

8. The copying apparatus as claimed in claim 7, further comprising a synchronous signal separator for separating a synchronous signal from an output signal of said demodulator, and outputting the separated synchronous signal.

9. The copying apparatus as claimed in claim 1, further comprising a burst gate pulse generator for receiving and delaying the separated synchronous signal by a predetermined time and generating a burst gate pulse for detecting a color burst signal.

10. The copying apparatus as claimed in claim 9, further comprising a second low-pass filter for removing a low frequency modulated luminance signal from the output signal of said gain controller, and outputting only a low frequency converted color signal.

11. The copying apparatus as claimed in claim 10, further comprising a burst level detector for detecting only a color burst signal from the low frequency converted color signal using the burst gate pulse from said burst gate pulse generator, and outputting the detected color burst signal to said gain controller.

12. A copying apparatus for picking up a modulated video signal recorded on a recording medium and directly copying the modulated video signal onto another medium, comprising:

a high-pass filter having a cutoff frequency higher than the frequency band of a low frequency converted color signal for separating a high-frequency modulated luminance signal from the modulated video signal;

a limiter for receiving the output signal of said high-pass filter and limiting the variation of the amplitude to a predetermined level;

a first characteristic compensator for receiving the output signal of said limiter and correcting high frequency characteristics of the signal;

a low-pass filter having a cutoff frequency such that a low frequency converted color signal and a low-frequency modulated luminance signal are separated from said modulated video signal;

a gain controller for receiving the output signal of said low pass filter and maintaining the received signal at a constant level;

a second characteristic compensator for receiving the output signal of said gain controller and correcting low frequency characteristics of the signal; and a mixer for mixing the output signal of said first characteristic compensator with the output signal of said second characteristic compensator, wherein the mixed output signal is recorded on a recording medium by a video head.

* * * * *